June 16, 1936.  G. HUHN  2,044,692
PACKING FOR THE SHAFTS OF STEAM TURBINES
Filed Feb. 9, 1935
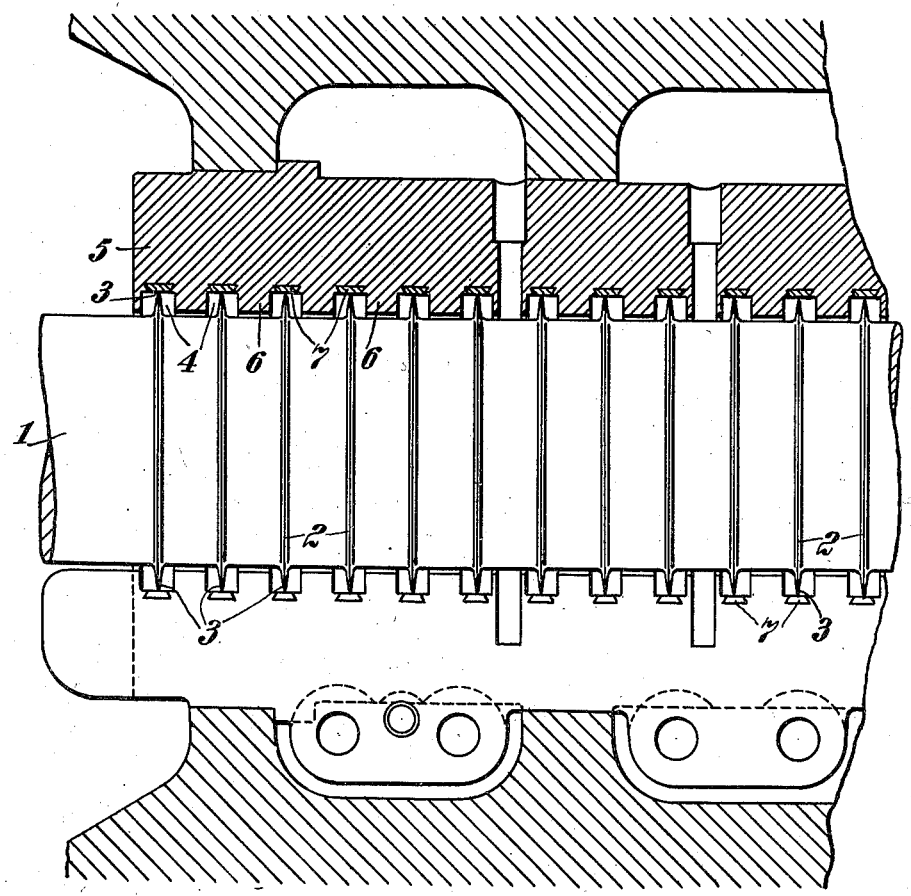
INVENTOR
GUSTAV HUHN
BY
ATTORNEYS Patented June 16, 1936

2,044,692

UNITED STATES PATENT OFFICE 2,044,692

PACKING FOR THE SHAFTS OF STEAM TURBINES

Gustav Huhn, Berlin-Tempelhof, Germany

Application February 9, 1935, Serial No. 5,837
In Germany November 25, 1933

2 Claims. (Cl. 286—10)

The invention aims to provide an improved packing for the shafts of high-pressure steam turbines, the packing being of a type in which the shaft carries annular ribs having knife-like outer peripheral edges cooperable with the inner peripheral surfaces of bearing rings carried by the casing. The ribs are formed of metal having substantially the same coefficient of thermal expansion as the shaft, and the rings which cooperate with the outer peripheral edges of said ribs are formed of a relatively soft material having a lower coefficient of thermal expansion than said ribs, whereby these ribs when expanded will cut individual paths in the inner surfaces of the bearing rings.

The bearing rings preferably consist of a mixture of graphite-carbon and a liquid or semi-liquid fixing agent and said rings will not, therefore, expand materially upon increase in the temperature of the shaft. These rings may well consist of a mixture of carbon, graphite and liquid synthetic resin, the mixture being introduced into dove-tail annular grooves of the casing in a plastic state and being subsequently solidified by heating. Owing to this special way of forming and attaching the bearing rings, they are immovably held even at high temperatures of the turbine and will not therefore become loosened.

The drawing illustrates a longitudinal sectional view partly in elevation, of a packing constructed in accordance with the invention.

The turbine shaft is illustrated at 1, and 5 denotes a portion of the turbine casing surrounding said shaft. Annular ribs 2 are integral with or otherwise secured to the shaft 1, said ribs having substantially the same coefficient of expansion as said shaft. The outer peripheral edges 3 of these ribs 2 are knife-like so that each rib edge forms a smooth circular line. The casing 5 is grooved to loosely receive the ribs 2 and the bottom of each groove 4 is of dove-tail cross section, and in each of these dove-tail groove portions, a bearing ring 7 is securely held, said bearing ring preferably consisting of the above-mentioned mixture placed in position in a plastic state and solidified by heating. The number of ribs 2, bearing rings 7 and grooves 4 is determined by the pressure used in operating the turbine. In the present disclosure, twelve of each, with the grooves 4 separated by narrow webs 6, are illustrated.

The packing effect is obtained by substantially a line packing. During the trial runs of the turbine, each annular rib 2 will cut its path on the relatively soft bearing ring or lining 7 even if axial motions of the shaft occur, and any slight irregularities in the circular contour of the ribs 2, will produce extremely narrow and shallow grooves or scores in the bearing surfaces, causing the entire packing to act similarly to a conventional labyrinth packing, with the difference however, that the grooves or scores in the bearing surfaces will be infinitely finer than could be obtained in a labyrinth packing consisting of metal webs.

The improved packing allows a gliding touch or contact between the edges of the ribs 2 and the rings or linings 7, subsequent to the grinding-in which occurs during the trial runs, and no appreciable friction will take place, particularly if the edges of the ribs 2 have been ground and a graphite-carbon material has been used for each lining or bearing surface.

The improved packing requires, when compared with the ordinary labyrinth packings, a much shorter length, and a comparatively small number of annular ribs and bearing surfaces will suffice to bring about the desired end. The packing may be applied to all kinds of steam turbines and other centrifugal machines and to all revolving parts of such machines. Although the arrangement shown, even when used in connection with comparatively high-speed pressures, produces a reliable packing, it may under certain conditions prove of advantage to combine said packing with one of some other type, for instance, an ordinary labyrinth packing.

I claim:—

1. A packing for a steam turbine shaft comprising circumferential annular ribs connected rigidly with the shaft and formed from a metal having a coefficient of thermal expansion similar to said shaft, said ribs having circular knife-shaped outer peripheral edges, the turbine casing being provided with bearing rings surrounding and co-axial with said ribs, said bearing rings being formed of a softer material than said ribs and being provided with annular inner peripheral faces for contact with said knife-shaped outer peripheral edges of said ribs, the coefficient of thermal expansion of said bearing rings being lower than that of said ribs, whereby said ribs upon thermal expansion may cut individual paths in said bearing rings.

2. A structure as specified in claim 1; the turbine casing being provided with circular grooves of dovetail cross section in which said bearing rings are snugly held, said bearing rings being composed of a heat-solidified material.

GUSTAV HUHN.